(12) United States Patent
Zhang et al.

(10) Patent No.: US 11,486,714 B2
(45) Date of Patent: Nov. 1, 2022

(54) MATCHING ALGORITHM FOR DATA WITH DIFFERENT SCALES BASED ON GLOBAL ROAD NETWORK FEATURES

(71) Applicant: WUHHAN KOTEL BIG DATE CORPORATION, Hubei (CN)

(72) Inventors: Cheng Zhang, Wuhan (CN); Yuejun Luo, Wuhan (CN); Xuan Wang, Wuhan (CN)

(73) Assignee: WUHHAN KOTEL BIG DATE CORPORATION, Wuhan (CN)

(*) Notice: Subject to any disclaimer, the term of this patent is extended or adjusted under 35 U.S.C. 154(b) by 404 days.

(21) Appl. No.: 16/702,719

(22) Filed: Dec. 4, 2019

(65) Prior Publication Data

US 2020/0116500 A1 Apr. 16, 2020

Related U.S. Application Data (63) Continuation of application No. PCT/CN2019/082132, filed on Apr. 10, 2019.

(30) Foreign Application Priority Data

Apr. 15, 2018 (CN) .......... 201810335065.X (51) Int. Cl.
*G01C 21/32* (2006.01)
*G01C 21/36* (2006.01)
(Continued)

(52) U.S. Cl.
CPC .......... *G01C 21/32* (2013.01); *G01C 21/367* (2013.01); *G06N 3/08* (2013.01); *G06Q 10/047* (2013.01)

(58) Field of Classification Search
CPC ..... H04L 5/0053; H04L 5/0048; H04L 5/001; H04L 5/0055; H04L 5/0007;
(Continued)

(56) References Cited

U.S. PATENT DOCUMENTS

2007/0129892 A1* 6/2007 Smartt ............... G01C 21/3844
702/5
2011/0160987 A1 6/2011 Wu
(Continued)

FOREIGN PATENT DOCUMENTS

| CN | 1787521 A | 6/2006 |
| CN | 101738193 A | 6/2010 |

(Continued)

OTHER PUBLICATIONS

International Search Report in the international application No. PCT/CN2019/082132, dated Jul. 10, 2019.

*Primary Examiner* — Khoi H Tran
*Assistant Examiner* — Nhi Q Bui
(74) *Attorney, Agent, or Firm* — Syncoda LLC; Feng Ma (57) ABSTRACT

A matching algorithm and device for data with different scales based on global road network features are provided. The method includes: loading data of different maps, constructing crossroad groups in each map, and extracting information on attributes of the crossroad groups; allocating, according to the importance degree of the attribute information, weights for each attribute of the crossroad groups, and comprehensively evaluating confidence values of matching between two crossroad groups in different maps; and constructing, according to the confidence values, matched road networks, calculating total confidence values of the matched road networks, and selecting a road network with the highest total confidence value as an optimal matching solution, namely a matching result.

10 Claims, 2 Drawing Sheets

(51) Int. Cl.
*G06N 3/08* (2006.01)
*G06Q 10/04* (2012.01)

(58) Field of Classification Search
CPC ..... H04L 5/0091; H04L 67/12; H04L 1/1861; G06F 16/29; G06F 16/9535; G06F 16/9537; G06F 40/30; G06N 3/0454; G06N 3/08; G06Q 50/30; G01C 21/32; G01C 21/30; G01C 21/20; G01C 21/26; G01C 21/206; G01C 21/34; G01C 21/165; G01C 21/367; G01C 21/005; G01C 21/3602; G01C 21/00; G01C 21/28; G01C 21/36; G01C 21/3667; G01C 21/3415; G01C 21/3492; G01C 21/3697
See application file for complete search history.

(56) References Cited

U.S. PATENT DOCUMENTS

2015/0354973 A1* 12/2015 Wang ................. G06V 30/1988
701/410
2017/0314934 A1* 11/2017 Averbuch ............... G01S 19/50

FOREIGN PATENT DOCUMENTS

| | | | |
|---|---|---|---|
| CN | 101788299 A | | 7/2010 |
| CN | 102110364 A | | 6/2011 |
| CN | 102183259 A | | 9/2011 |
| CN | 103852083 A | | 6/2014 |
| CN | 104850824 A | * | 8/2015 |
| CN | 104850824 A | | 8/2015 |
| CN | 107292919 A | | 10/2017 |
| CN | 108709561 A | | 10/2018 |
| JP | 2007286629 A | | 11/2007 |

* cited by examiner

MATCHING ALGORITHM FOR DATA WITH DIFFERENT SCALES BASED ON GLOBAL ROAD NETWORK FEATURES

CROSS-REFERENCE TO RELATED APPLICATIONS

This is a continuation application of International Patent Application No. PCT/CN2019/082132, filed on Apr. 10, 2019, which claims priority from Chinese patent application No. 201810335065.X, the contents of which are hereby incorporated by reference in their entirety.

TECHNICAL FIELD

The disclosure relates to the field of computer technology and map navigation, and particularly, to a matching algorithm for data with different scales based on global road network features.

BACKGROUND

In the emerging era of automatic driving, an in-vehicle map must be changed from single use of traditional map data to combined use of traditional map data and high-precision map data. It is necessary to match the traditional map data with the high-precision map data. However, because map providers of a traditional map and a high-precision map are often different, data models are different from data ranges of the traditional map and the high-precision map, GPS coordinates of the same name of the two maps are different or even offset due to data encryption, and road networks are greatly different due to different mapping time (timeliness) between the traditional map and the high-precision map.

At present, the conventional patent technologies for map number matching rely on GPS coordinates, and the GPS coordinates of the same-named map data of different scales are not the same, which cannot match the map data of different scales. Since the data model and the data range are different, it is not possible to use a uniform method for offset processing.

Data matching of traditional maps and high-precision maps is adopted as an example for explanation herein.

SUMMARY

Explanation of the names involved herein:

Crossroad: An area where multiple roads meet, or an area where road rights are selected is called a crossroad, and a center point of the crossroad is denoted as a crossroad point.

Adjacent crossroad of crossroad: referring to a crossroad at which a motor vehicle may arrive at a current crossroad through the only passable road (there is no intersection area of roads).

The disclosure provides a matching algorithm and device for data with different scales based on global road network features for the technical problems existing in the conventional art. By extracting global road network features, a crossroad group in map data is used as a feature point, and the map data with different scales is matched by means of a relative position relationship between attributes of the feature point and the feature point.

The technical solution of the disclosure to solve the above technical problems is as follows.

In one aspect, the disclosure provides a matching algorithm for data with different scales based on global road network features, which may include the following steps.

Step 1: Different map data is loaded, crossroad groups in each map are respectively constructed, and attribute information of the crossroad groups is extracted.

Step 2: According to the importance degree of the attribute information, weights are allocated for each attribute of the crossroad groups, and confidence values of matching between two crossroad groups in different maps are comprehensively evaluated.

Step 3: According to the confidence values, matched road networks are constructed, confidence values of the matched road networks are calculated, and matched road network combinations are constructed by means of the matched road networks. Confidence value of matching of the road network combinations are calculated as total confidence values according to a relative position relationship of the respective road networks in the matched road network combinations, and a road network combination with the highest total confidence value is selected as an optimal matching solution, namely a matching result.

Further, step 1 may include:

Step 101: Traditional map data map1 is loaded, a crossroad point in map1 is extracted, and adjacent crossroad points of each crossroad are acquired by means of road connectivity.

Step 102: High-precision map data map2 is loaded, a crossroad point in map2 is extracted, and adjacent crossroad points of each crossroad are acquired by means of road connectivity.

Step 103: Crossroad groups of map1 and map2 are respectively constructed by means of a road connection relationship.

Step 104: Crossroad group attribute information is extracted, the crossroad group attribute information including: connection and position relationships between crossroad groups, number of crossroads, crossroad attributes within a crossroad group, connection and position relationships between crossroads within a crossroad group, attribute information of roads within a crossroad group, and attribute information of roads connecting crossroad groups.

Further, the attribute information of roads within a crossroad group may include: road name, administrative division, road width, road shape, road class, and road type.

Further, step 2 may include:

Step 201: Weights are allocated for each attribute of the crossroad groups according to an experience or a deep learning method.

Step 202: Any crossroad group $JG_i$ in the traditional map data map1 is taken as an object, and a matched crossroad group $JG'_j$ is found in the high-precision map data map2, where i and j are integers.

Step 203: If a pair of crossroad groups in data of different maps have identical attributes, confidence values of matching of the pair of crossroad groups are calculated according to weights of attributes, and if there are no identical attributes, the confidence values of matching are set to 0.

Step 204: A matched crossroad group set corresponding to all crossroad groups in the traditional map data map1 is finally obtained.

Further, step 3 may include:

Step 301: Any crossroad group $JG_i$ in the traditional map data map1 is selected as an object, a crossroad group in the high-precision group and matching the crossroad group JGi being $JG'_j$.

Step 302: If a matched crossroad group $JG'_n$ of an adjacent crossroad group $JG_m$ of the crossroad group $JG_i$ in the high-precision map data map2 is an adjacent crossroad group of the crossroad group $JG'_j$ and the confidence value is greater than 0, it is considered that a road network formed by $JG_i \rightarrow JG_m$ matches a road network formed by $JG'_j \rightarrow JG'_n$.

Step 303: The crossroad group $JG_m$ is selected as an object, and step 302 is repeated to finally obtain matched road networks $N_i$ and $N'_j$ that respectively take the crossroad groups $JG_i$ and $JG'_j$ as central crossroad groups and are formed by all the connection relationships matched with $JG_i$ and $JG'_j$.

Step 304: For one of the road networks $N_i$ with the crossroad group $JG_i$ as the central crossroad group, the confidence values of the crossroad groups in multiple matched road network $N'_j$ with the crossroad group $JG'_j$ as the central crossroad group are summed to obtain confidence value of matching of $N_i$ and $N'_j$.

Step 305: According to the principle that a crossroad and a matched crossroad do not cross, all road networks in map1 that are denoted as $N_0, \ldots, N_n$, and corresponding road network combinations in map2 that are denoted as $N'_0, \ldots, N'_n$ are obtained, where n is an integer, and at this time, there is no matched connected road between two of $N_0, \ldots, N_n$ and between two of $N'_0, \ldots, N'_m$.

Step 306: According to a matching relationship, multiple combinations of $N_0, \ldots, N_x$ (x is an integer, which may be different from or the same as n) may be obtained in map1 and map2. In different combinations, road networks or crossroad groups may be repeated, but in the same combination, crossroads contained in different road networks or crossroad groups and matched crossroads corresponding to the crossroads cannot be repeated.

Step 307: Confidence value of matching of the road network combinations $N_0, \ldots,$ in map1 and the road network combinations $N'_0, \ldots, N'_m$ in map2 are calculated according to the relative position relationship of the road networks in the road network combinations to obtain total confidence values.

Step 308: A road network combination with the highest total confidence value is selected as an optimal matching solution.

In another aspect, the disclosure also provides a matching device for data with different scales based on global road network features, which may include:

a map loading module, configured to load data of different maps, respectively construct crossroad groups in each map, and extract attribute information of the crossroad groups;

a confidence value evaluation module, configured to allocate, according to the importance degree of the attribute information, weights for each attribute of the crossroad groups, and comprehensively evaluate confidence values of matching between two crossroad groups in different maps; and a road network matching module, configured to construct, according to the confidence values, matched road networks, calculate confidence values of all the matched road networks in the map, and select a road network combination with the highest total confidence value as an optimal matching solution, namely a matching result.

Further, the map loading module may include:

a first map loading module, configured to load traditional map data map1, extract crossroad points in map1, and acquire adjacent crossroad points of each crossroad by means of road connectivity;

a second map loading module, configured to load high-precision map data map2, extract crossroad points in map2, and acquire adjacent crossroad points of each crossroad by means of road connectivity;

a crossroad group construction module, configured to respectively construct crossroad groups of map1 and map2 by means of a road connection relationship; and an attribute extraction module, configured to extract crossroad group attribute information, the crossroad group attribute information comprising: connection and position relationships between crossroad groups, number of crossroads, crossroad attributes within a crossroad group, connection and position relationships between crossroads within a crossroad group, attribute information of roads within a crossroad group, and attribute information of roads connecting crossroad groups.

Further, the attribute information of roads within a crossroad group may include: road name, administrative division, road width, road shape, road class, and road type.

Further, the confidence value evaluation module may include:

a weight allocation module, configured to allocate weights for each attribute of the crossroad groups according to an experience or a deep learning method; and a crossroad group set generation module, configured to: select any crossroad group $JG_i$ in the traditional map data map1 as an object, and search for a matched crossroad group $JG'_j$ in the high-precision map data map2, where i and j are integers; if a pair of crossroad groups in data of different maps have identical attributes, calculate confidence values of matching of the pair of crossroad groups according to weights of attributes, and if there are no identical attributes, set the confidence values of matching to 0; and finally obtain a matched crossroad group set corresponding to all crossroad groups in the traditional map data map1.

Further, the road network matching module may include:

a matched road network generation module, configured to: select any crossroad group $JG_i$ in the traditional map data map1 as an object, a crossroad group in the high-precision group and matching the crossroad group JGi being $JG'_j$; if a crossroad group $JG_m$ in the high-precision map data map2 and matching an adjacent crossroad group $JG'_j$ of the crossroad group $JG_i$ is an adjacent crossroad group of the crossroad group $JG'_j$ and the confidence value is greater than 0, consider that a road network formed by $JG_i \rightarrow JG_m$ matches a road network formed by $JG'_j \rightarrow JG'_n$;

a total confidence value calculation module, configured to: sum, for one of the road networks $N_i$ with the crossroad group $JG_i$ as the central crossroad group, the confidence values of the crossroad groups in multiple matched road network $N'_j$ with the crossroad group $JG'_j$ as the central crossroad group to obtain confidence value of matching of $N_i$ and $N'_j$; obtain, according to the principle that a crossroad and a matched crossroad do not cross, all road networks in map1 that are denoted as $N_0, \ldots, N_n$, and corresponding road network combinations in map2 that are denoted as $N'_0, \ldots, N'_n$, where n is an integer, and at this time, there is no matched connected road between two of $N_0, \ldots, N_n$ and between two of $N'_0, \ldots, N'_m$; obtain, according to a matching relationship, multiple combinations of $N_0, \ldots, N_x$ (x is an integer, which may be different from or the same as n) in map1 and map2, wherein in different combinations, road networks or crossroad groups may be repeated, but in the same combination, crossroads contained in different road networks or crossroad groups and matched crossroads corresponding to the crossroads cannot be repeated; and calculate confidence value of matching of the road network combinations $N_0, \ldots, N_n$ in map1 and the road network combinations $N'_0, \ldots, N'_m$ in map2 according to the relative position relationship of the road networks in the road network combinations to obtain total confidence values; and a matching result output module, configured to select a road network combination with the highest total confidence value as an optimal matching solution.

The beneficial effects of the disclosure are as follows.

1: High matching rate: Due to the feature matching of the overall road network similar to the data correction in mapping, there is a sufficient theoretical basis to explain the matching rate problem of the algorithm.

2: Wide applicability: Because the algorithm mainly uses a relative position relationship, as long as the relative position relationship of the crossroad groups in the map is known, the data can be matched. Further, it may be extended to be applied to positioning the difference between two maps during map data update.

3: Further improvement of matching rate: The attribute of the crossroad group in the algorithm and the confidence value corresponding to attribute matching can be replaced by a deep learning algorithm, and by continuously optimizing a focus attribute and the confidence value corresponding to attribute matching, the matching rate can be increased to nearly 100%.

DETAILED DESCRIPTION

The principles and features of the disclosure are described in the following examples, which are intended to illustrate the disclosure and are not intended to limit the scope of the disclosure.

Figure 1:
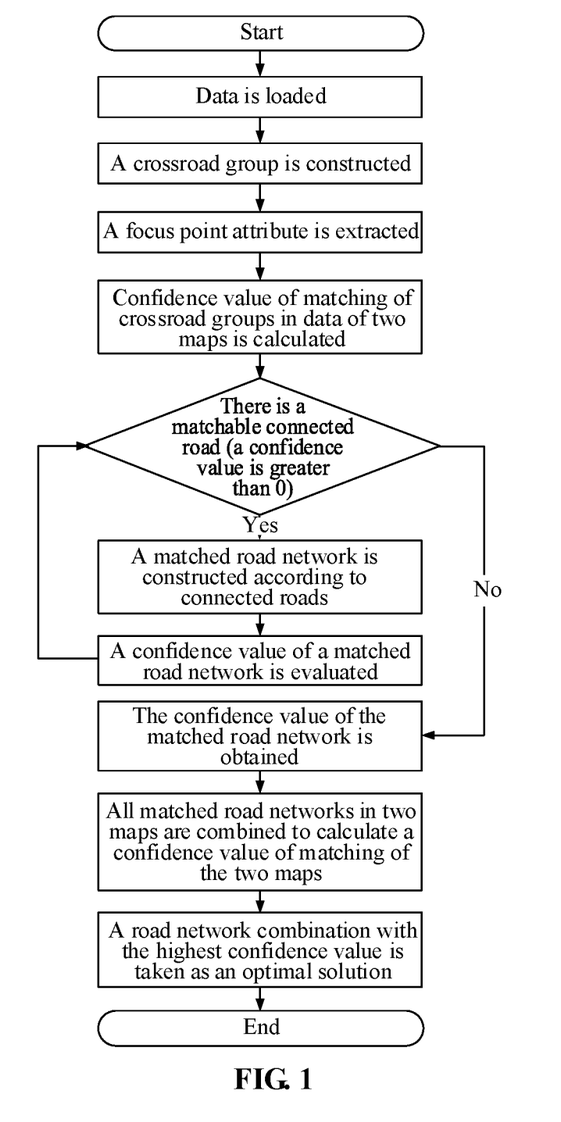
FIG. 1 is a flowchart of a matching algorithm for data with different scales based on global road network features according to at least some embodiments of the disclosure.

FIG. 1 is a flowchart of a matching algorithm for data with different scales based on global road network features according to at least some embodiments of the disclosure. As shown in FIG. 1, the matching algorithm includes the following steps.

Step 1: Different map data is loaded, crossroad groups in each map are respectively constructed, and attribute information of the crossroad groups is extracted.

Step 2: According to the importance degree of the attribute information, weights are allocated for each attribute of the crossroad groups, and confidence values of matching between two crossroad groups in different maps are comprehensively evaluated.

Step 3: According to the confidence values, matched road networks are constructed, confidence values of the matched road networks are calculated, and matched road network combinations are constructed by means of the matched road networks. Confidence value of matching of the road network combinations are calculated as total confidence values according to a relative position relationship of the respective road networks in the matched road network combinations, and a road network combination with the highest total confidence value is selected as an optimal matching solution, namely a matching result.

Specifically, the implementation process of the disclosure is as follows:

1: Traditional map data map1 is loaded, a crossroad point in map1 is extracted, and adjacent crossroad points of each crossroad are acquired by means of road connectivity.

2: High-precision map data map2 is loaded, a crossroad in map2 is extracted, and adjacent crossroads of each crossroad are acquired by means of road connectivity.

3: Crossroad groups of map1 and map2 are respectively constructed by means of a road connection relationship.

4: Focus attributes are extracted, that is, a connection relationship and a relative position relationship between crossroad groups, crossroad attributes in crossroad groups, number of crossroads, a connection relationship and a relative position relationship between intra-group crossroads, attribute information of roads within a crossroad group, and attribute information of roads connecting crossroad groups, etc.

The connection relationship refers to the number of roads entering and leaving the crossroad (group) and adjacent crossroad information leading to the crossroad.

The attribute information of roads within a crossroad group includes the attribute of roads in crossroad groups, including: road name, administrative division, road width, road shape, road class, road type, etc.

5: A matched crossroad group JG' is found in map2 with any crossroad group JG1 in map1, and the matched confidence value is evaluated by whether the focus attributes are the same. At this point, multiple crossroad groups that match JG1 may be found, denoted as JG'1, JG'2, . . . , JG'n.

The focus attribute is one or more of the attributes of the crossroad group and the attributes of roads between the crossroad groups, and the weights are allocated to the focus attributes according to experience or deep learning. In the traditional map data and the high-precision map data, if there is a pair of crossroad groups having the same focus attribute, the matched confidence of the pair of crossroad groups can be calculated according to the weight of the focus point. If there is no same focus attribute, the matching degree is 0.

6: According to the matching result of JG1, the crossroad groups JG'1, JG'2, . . . , JG'n matching JG1 can be found, and are represented by JG'i (i is a value between 1, 2, . . . , n). If the adjacent crossroad group JG11 of JG1 matches the adjacent crossroad group JG'ii of JG'i with a confidence value greater than 0, the road network composed of JG1→JG11 matches the road network composed of JG'i→JG'ii. The adjacent crossroad group JG111 of JG11 and the adjacent crossroad group JG'iii of JG'ii are found, and the confidence value satisfying the matching of JG111 and JG'iii is greater than zero. Then, the road network composed of JG1→JG11→JG111 matches the road network composed of JG'i→JG'ii→JG'iii. Thus, a road network matching JG1 and JG'i is constructed, denoted as N1 and N'i.

7: The confidence values of N1 and N'i (i is a value between 1, 2, . . . , n) are respectively calculated by using a method of summing the confidence values of matching of the crossroad groups in N1 and N'i.

8: N1 and N'i (i is a value between 1, 2, . . . , n) are regarded as a new crossroad group, and a connection relationship and relative position information between the road networks in map1 and map2 are respectively acquired through the connection relationship between roads.

9: Steps 5-8 are repeated with the new crossroad group until a new matched road network cannot be constructed.

10: The road network with the highest confidence value is acquired as an optimal matching solution.

Figure 2:
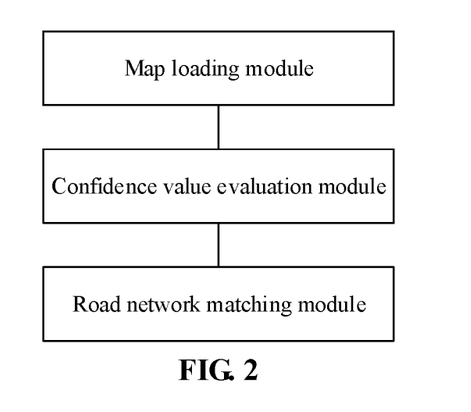
FIG. 2 is a structural diagram of a matching device for data with different scales based on global road network features according to at least some embodiments of the disclosure.

The disclosure provides a matching device for data with different scales based on global road network features on the basis of the algorithm. As shown in FIG. 2, the device includes a map loading module, a confidence value evaluation module and a road network matching module.

The map loading module is configured to load data of different maps, respectively construct crossroad groups in each map, and extract attribute information of the crossroad groups.

The confidence value evaluation module is configured to allocate, according to the importance degree of the attribute information, weights for each attribute of the crossroad groups, and comprehensively evaluate confidence values of matching between two crossroad groups in different maps.

The road network matching module is configured to construct, according to the confidence values, matched road networks, calculate confidence values of the matched road networks, and construct matched road network combinations by means of the matched road networks. Confidence value of matching of the road network combinations are calculated as total confidence values according to a relative position relationship of the respective road networks in the matched road network combinations, and a road network combination with the highest total confidence value is selected as an optimal matching solution, namely a matching result.

Further, the map loading module includes a first map loading module, a second map loading module, a crossroad group construction module, and an attribute extraction module.

The first map loading module is configured to load traditional map data map1, extract crossroad points in map1, and acquire adjacent crossroad points of each crossroad by means of road connectivity.

The second map loading module is configured to load high-precision map data map2, extract crossroad points in map2, and acquire adjacent crossroad points of each crossroad by means of road connectivity.

The crossroad group construction module is configured to respectively construct crossroad groups of map1 and map2 by means of a road connection relationship.

The attribute extraction module is configured to extract crossroad group attribute information, the crossroad group attribute information comprising: connection and position relationships between crossroad groups, number of crossroads, crossroad attributes within a crossroad group, connection and position relationships between crossroads within a crossroad group, attribute information of roads within a crossroad group, and attribute information of roads connecting crossroad groups.

Further, the attribute information of roads within a crossroad group includes: road name, administrative division, road width, road shape, road class, and road type.

Further, the confidence value evaluation module includes a weight allocation module and a crossroad group set generation module.

The weight allocation module is configured to allocate weights for each attribute of the crossroad groups according to an experience or a deep learning method.

The crossroad group set generation module is configured to: select any crossroad group $JG_i$ in the traditional map data map1 as an object, and search for a matched crossroad group $JG'_j$ in the high-precision map data map2, where i and j are integers; if a pair of crossroad groups in data of different maps have identical attributes, calculate confidence values of matching of the pair of crossroad groups according to weights of attributes, and if there are no identical attributes, set the confidence values of matching to 0; and finally obtain a matched crossroad group set corresponding to all crossroad groups in the traditional map data map1.

Further, the road network matching module includes a matched road network generation module, a total confidence value calculation module and a matching result output module.

The matched road network generation module is configured to: select any crossroad group $JG_i$ in the traditional map data map1 as an object, a crossroad group in the high-precision group and matching the crossroad group $JG_i$ being $JG'_j$; if a crossroad group $JG'_n$ in the high-precision map data map2 and matching an adjacent crossroad group $JG_m$ of the crossroad group $JG_i$ is an adjacent crossroad group of the crossroad group $JG'_j$ and the confidence value is greater than 0, consider that a road network formed by $JG_i \rightarrow JG_m$ matches a road network formed by $JG'_j \rightarrow JG'_n$.

The total confidence value calculation module is configured to: sum, for one of the road networks $N_i$ with the crossroad group $JG_i$ as the central crossroad group, the confidence values of the crossroad groups in multiple matched road network $N'_j$ with the crossroad group $JG'_j$ as the central crossroad group to obtain confidence value of matching of $N_i$ and $N'_j$; obtain, according to the principle that a crossroad and a matched crossroad do not cross, all road networks in map1 that are denoted as $N_0, \ldots, N_n$ (n is an integer), and corresponding road network combinations in map2 that are denoted as $N'_0, \ldots, N'_n$, where n is an integer, and at this time, there is no matched connected road between two of $N_0, \ldots, N_n$ and between two of $N'_0, \ldots, N'_m$; obtain, according to a matching relationship, multiple combinations of $N_0, \ldots, N_x$ (x is an integer, which may be different from or the same as n) in map1 and map2, where in different combinations, road networks or crossroad groups may be repeated, but in the same combination, crossroads contained in different road networks or crossroad groups and matched crossroads corresponding to the crossroads cannot be repeated; and calculate confidence value of matching of the road network combinations $N_0, \ldots, N_n$ in map1 and the road network combinations $N'_0, \ldots, N'_m$ in map2 according to the relative position relationship of the road networks in the road network combinations to obtain total confidence values.

The matching result output module is configured to select a road network combination with the highest total confidence value as an optimal matching solution.

Compared with the conventional art, the disclosure has the following effects.

1: High matching rate: Due to the feature matching of the overall road network similar to the data correction in mapping, there is a sufficient theoretical basis to explain the matching rate problem of the algorithm.

2: Wide applicability: Because the algorithm mainly uses a relative position relationship, as long as the relative position relationship of the crossroad groups in the map is known, the data can be matched. Further, it may be extended to be applied to positioning the difference between two maps during map data update.

3: Further improvement of matching rate: A focus attribute in the algorithm and the confidence value corresponding to attribute matching can be replaced by a deep learning algorithm, and by continuously optimizing the focus attribute and the confidence value corresponding to attribute matching, the matching rate can be increased to nearly 100%.

Data matching of traditional maps and high-precision maps is adopted as an example for explanation herein. The disclosure has the advantages of high matching rate and wide applicability.

In an exemplary embodiment, each of the map loading module, confidence value evaluation module, road network matching module, first map loading module, second map loading module, crossroad group construction module, attribute extraction module, weight allocation module, crossroad group set generation module, matched road network generation module, total confidence value calculation module and matching result output module may be a processor or a controller (which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof. It may implement or execute various exemplary logical blocks, modules and circuits described in combination with the contents disclosed in the disclosure. The processor may also be a combination realizing a calculation function (for example, including a combination of one or more microprocessors and a combination of a DSP and a microprocessor. The storage unit 1302 may be a memory.

An embodiment of the disclosure also provides a computer-readable storage medium, which stores a computer program configured for electronic data exchange, the computer program enabling a computer to execute part or all of the operations executed in the abovementioned methods.

An embodiment of the disclosure also provides a computer program product. The computer program product includes a non-transitory computer-readable storage medium storing a computer program. The computer program may be operated to enable a computer to execute part or all of the operations executed in the abovementioned methods. The computer program product may be a software installation package.

The operations of the method or algorithm described in the embodiments of the disclosure may be implemented in a hardware manner, or may be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The above is only the preferred embodiment of the disclosure and is not intended to limit the disclosure. Any modifications, equivalent replacements, improvements and the like made within the spirit and principle of the disclosure shall fall within the scope of protection of the disclosure.

The invention claimed is:

1. A method for matching data with different scales based on global road network features, comprising:
    step 1 of loading data of different maps, constructing crossroad groups in each map, and extracting information on attributes of the crossroad groups;
    step 2 of allocating, according to an importance degree of the attribute information, weights for each attribute of the crossroad groups, and comprehensively evaluating confidence values of matching between two crossroad groups in different maps; and
    step 3 of constructing, according to the confidence values, matched road networks, calculating confidence values of the matched road networks, constructing matched road network combinations through the matched road networks, calculating confidence values of matching of the road network combinations as total confidence values according to a relative position relationship of the respective road networks in the matched road network combinations, and selecting a road network combination with the highest total confidence value as an optimal matching solution, namely a matching result.

2. The method for matching data with different scales based on global road network features of claim 1, wherein the step 1 comprises:
    step 101 of loading traditional map data map1, extracting crossroad points in map1, and acquiring adjacent crossroad points of each crossroad through road connectivity;
    step 102 of loading high-precision map data map2, extracting crossroad points in map2, and acquiring adjacent crossroad points of each crossroad by means of through road connectivity;
    step 103 of respectively constructing crossroad groups of map1 and map2 through road connection relationship; and
    step 104 of extracting crossroad group attribute information, the crossroad group attribute information comprising: connection and position relationships between crossroad groups, number of crossroads, crossroad attributes within a crossroad group, connection and position relationships between crossroads within a crossroad group, attribute information of roads within a crossroad group, and attribute information of roads connecting crossroad groups.

3. The method for matching data with different scales based on global road network features of claim 2, wherein the attribute information of roads within a crossroad group comprises: road name, administrative division, road width, road shape, road class, and road type.

4. The method for matching data with different scales based on global road network features of claim 2, wherein the step 2 comprises:
   step 201 of allocating the weights for each attribute of the crossroad groups according to an experience or a deep learning method;
   step 202 of taking any crossroad group JG in the traditional map data map1 as an object, and searching for a matched crossroad group $JG'_j$ in the high-precision map data map2, where i and j are integers;
   step 203 of: if a pair of crossroad groups in the traditional map data map1 and the high-precision map data map2 respectively have identical attributes, calculating confidence values of matching of the pair of crossroad groups according to the weights of the attributes, and if there are no identical attributes, setting the confidence values of matching to 0; and
   step 204 of finally obtaining a matched crossroad group set corresponding to all crossroad groups in the traditional map data map1.

5. The method for matching data with different scales based on global road network features of claim 4, wherein the step 3 comprises:
   step 301 of selecting any crossroad group $JG_i$ in the traditional map data map1 as an object, wherein a selected crossroad group $JG_i$ matches a crossroad group $JG'_j$ in the high-precision map data;
   step 302 of: if a crossroad group $JG'_n$, in the high-precision map data map2, that matches a crossroad group $JG_m$ adjacent to the crossroad group $JG_i$ is a crossroad group adjacent to the crossroad group $JG'_j$ and the confidence value is greater than 0, considering that a road network formed by $JG_i$ to $JG_m$ matches a road network formed by $JG'_j$ to $JG'_n$;
   step 303 of selecting the crossroad group $JG_m$ as an object, and repeating the step 302 to finally obtain matched road networks $N_i$ and $N'_j$ that respectively take the crossroad groups $JG_i$ and $JG'_j$ as central crossroad groups and are formed by all the connection relationships matched with $JG_i$ and $JG'_j$;
   step 304 of summing, for one of the road networks $N_i$ with the crossroad group $JG_i$ as the central crossroad group, the confidence values of the crossroad groups in a plurality of matched road networks $N'_j$ each matching the road network Ni and taking the crossroad group $JG'_j$ as the central crossroad group to obtain a confidence value of matching of $N_i$ and $N'_j$;
   step 305 of obtaining, according to a principle that a crossroad and a matched crossroad do not cross, all road networks in map1 that are denoted as $N_0, \ldots, N_n$, and corresponding road network combinations in map2 that are denoted as $N_0, \ldots, N'_n$ where n is an integer, and there is no matched connected road between two of $N_0, \ldots, N_n$ and between two of $N'_0, \ldots, N'_m$;
   step 306 of obtaining, according to a matching relationship, a plurality of combinations of $N_0, \ldots, N_x$ in map1 and $N'_0, \ldots, N'_m$ in map2, where x is an integer, which may be different from or identical to n, wherein in different combinations, road networks or crossroad groups may be repeated, but in the same combination, crossroads contained in different road networks or crossroad groups and matched crossroads corresponding to the crossroads cannot be repeated;
   step 307 of calculating confidence values of matching of the road network combinations $N_0, \ldots, N_n$ in map1 and the road network combinations $N'_0, \ldots, N'_n$ in map2 according to the relative position relationship of the road networks in the road network combinations to obtain total confidence values; and
   step 308 of selecting a road network combination with the highest total confidence value as an optimal matching solution.

6. A matching device for data with different scales based on global road network features, comprising:
   a memory for storing instructions;
   a processor configured to execute the instructions to perform:
   loading data of different maps, construct crossroad groups in each map, and extracting information on attributes of the crossroad groups;
   allocating, according to an importance degree of the attribute information, weights for each attribute of the crossroad groups, and comprehensively evaluating confidence values of matching between two crossroad groups in different maps; and
   constructing, according to the confidence values, matched road networks, calculate confidence values of the matched road networks, constructing matched road network combinations through the matched road networks, calculating confidence values of matching of the road network combinations as total confidence values according to a relative position relationship of the respective road networks in the matched road network combinations, and selecting a road network combination with the highest total confidence value as an optimal matching solution, namely a matching result.

7. The matching device for data with different scales based on global road network features of claim 6, wherein loading data of different maps, construct crossroad groups in each map, and extracting information on attributes of the crossroad groups comprises:
   loading traditional map data map1, extracting crossroad points in map1, and acquiring adjacent crossroad points of each crossroad by means of through road connectivity;
   loading high-precision map data map2, extracting crossroad points in map2, and acquiring adjacent crossroad points of each crossroad through road connectivity;
   respectively constructing crossroad groups of map1 and map2 through a road connection relationship; and
   extracting crossroad group attribute information, the crossroad group attribute information comprising: connection and position relationships between crossroad groups, number of crossroads, crossroad attributes within a crossroad group, connection and position relationships between crossroads within a crossroad group, attribute information of roads within a crossroad group, and attribute information of roads connecting crossroad groups.

8. The matching device for data with different scales based on global road network features of claim 7, wherein the attribute information of roads within a crossroad group comprises: road name, administrative division, road width, road shape, road class, and road type.

9. The matching device for data with different scales based on global road network features of claim 7, wherein allocating, according to the importance degree of the attribute information, weights for each attribute of the crossroad groups, and comprehensively evaluating confidence values of matching between two crossroad groups in different maps comprises:
  allocating the weights for each attribute of the crossroad groups according to an experience or a deep learning method; and
  selecting any crossroad group $JG_i$ in the traditional map data map1 as an object, and searching for a matched crossroad group $JG'_j$ in the high-precision map data map2, where i and j are integers; if a pair of crossroad groups in the traditional map data map1 and the high-precision map data map2 respectively have identical attributes, calculating confidence values of matching of the pair of crossroad groups according to the weights of the attributes, and if there are no identical attributes, setting the confidence values of matching to 0; and finally obtaining a matched crossroad group set corresponding to all crossroad groups in the traditional map data map1.

10. The matching device for data with different scales based on global road network features of claim 9, wherein the processor is configured to:
  selecting any crossroad group $JG_i$ in the traditional map data map1 as an object, wherein a selected crossroad group $JG_i$ matches a crossroad group $JG'_j$ in the high-precision map data; if a crossroad group $JG'_n$, in the high-precision map data map2, that matches a crossroad group $JG_m$ adjacent to the crossroad group $JG_i$ is a crossroad group adjacent to the crossroad group $JG'_j$ and the confidence value is greater than 0, considering that a road network formed by $JG_i$ to $JG_m$ matches a road network formed by $JG'_j$ to $JG'_n$;

summing, for one of the road networks $N_i$ with the crossroad group $JG_i$ as the central crossroad group, the confidence values of the crossroad groups in a plurality of matched road networks $N'_j$ each matching the road network Ni and taking the crossroad group $JG'_j$ as the central crossroad group to obtain a confidence value of matching of $N_i$ and $N'_j$; obtaining, according to a principle that a crossroad and a matched crossroad do not cross, all road networks in map1 that are denoted as $N_0, \ldots, N_n$, where n is an integer, and, there is no matched connected road between two of $N_0, \ldots, N_n$; obtaining, according to a matching relationship, a plurality of combinations of $N_0, \ldots, N_x$ in map1, where x is an integer, which may be different from or identical to n, wherein in different combinations, road networks or crossroad groups may be repeated, but in the same combination, crossroads contained in different road networks or crossroad groups and matched crossroads corresponding to the crossroads cannot be repeated; also obtaining corresponding road network combinations in map2 that are denoted as $N'_0, \ldots, N'_m$, where m is an integer which is equal to the number of road networks in map1, and there is no matched connected road between two of $N'_0, \ldots, N'_m$; calculating confidence values of matching of the road network combinations $N_0, \ldots, N_n$ in map1 and the road network combinations $N'_0, \ldots, N'_m$, in map2 according to the relative position relationship to obtain total confidence values; and selecting a road network combination with the highest total confidence value as an optimal matching solution.

\* \* \* \* \*